United States Patent
Altmann (10) Patent No.: US 8,458,343 B2
(45) Date of Patent: Jun. 4, 2013

(54) SIGNALING FOR TRANSITIONS BETWEEN MODES OF DATA TRANSMISSION

(75) Inventor: William Conrad Altmann, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 976 days.

(21) Appl. No.: 12/512,877

(22) Filed: Jul. 30, 2009

(65) Prior Publication Data
US 2011/0029677 A1 Feb. 3, 2011

(51) Int. Cl.
*G06F 15/16* (2006.01)

(52) U.S. Cl.
USPC .......................................... 709/228

(58) Field of Classification Search
USPC .......................................... 709/228
See application file for complete search history.

(56) References Cited

U.S. PATENT DOCUMENTS

| | | | |
|---|---|---|---|
| 5,668,880 A | 9/1997 | Alajajian | |
| 5,949,777 A | 9/1999 | Uyesugi et al. | |
| 6,791,538 B2 | 9/2004 | Van Vugt | |
| 6,820,049 B1 | 11/2004 | Monroe et al. | |
| 7,088,398 B1* | 8/2006 | Wolf et al. | 348/423.1 |
| 7,131,004 B1 | 10/2006 | Lyle | |
| 7,242,766 B1 | 7/2007 | Lyle | |
| 7,702,101 B2 | 4/2010 | Malcolm et al. | |
| 2002/0035690 A1* | 3/2002 | Nakano | 713/171 |
| 2002/0164963 A1* | 11/2002 | Tehrani et al. | 455/101 |
| 2003/0043142 A1 | 3/2003 | Ishibashi | |
| 2005/0117601 A1* | 6/2005 | Anderson et al. | 370/465 |
| 2007/0009060 A1 | 1/2007 | Lavelle et al. | |
| 2009/0015723 A1* | 1/2009 | Doumuki | 348/725 |
| 2009/0222905 A1* | 9/2009 | Choi et al. | 726/11 |

FOREIGN PATENT DOCUMENTS

| | | |
|---|---|---|
| EP | 1995952 | 11/2008 |
| WO | WO-9713353 | 4/1997 |
| WO | WO-0122302 | 3/2001 |

OTHER PUBLICATIONS

International Search Report and Written Opinion for International Patent Application No. PCT/US2010/041246 mailed Nov. 8, 2010, 17 pages.
International Search Report and Written Opinion for International Patent Application No. PCT/US2010/050400 mailed Nov. 30, 2010, 15 pages.
International Preliminary Report on Patentability and the Written Opinion of the International Searching Authority from PCT/US2010/041246 mailed Feb. 9, 2012, 11 pgs.
Non-Final Office Action for U.S. Appl. No. 12/570,874, Mailed Dec. 19, 2011, 20 pages.
Final Office Action for U.S. Appl. No. 12/570,874, Mailed May 11, 2012, 22 pages.

* cited by examiner

*Primary Examiner* — John MacIlwinen
(74) *Attorney, Agent, or Firm* — Blakely Sokoloff Taylor Zafman LLP (57) ABSTRACT

Embodiments of the invention are generally directed to signaling for transitions between modes of data transmission. A embodiment of a method includes transmitting a data stream over a data link from a first device to a second device, the data stream operating in a first mode; determining that the data stream is to be changed from the first mode to a second mode; and transmitting a message from the first device to the receiver over a control link, the message indicating that the first device will change the data stream from the first mode to the second mode, the message being sent prior to the change to the second mode.

23 Claims, 9 Drawing Sheets

SIGNALING FOR TRANSITIONS BETWEEN MODES OF DATA TRANSMISSION

TECHNICAL FIELD

Embodiments of the invention generally relate to the field of data communications and, more particularly, provision of signaling for transitions between modes of data transmission.

BACKGROUND

In certain systems, data may be transmitted over a data link between a first device and a second device. For example, data may include a data stream of audio/video data or other content data sent from a first device to second device, where the second device may either utilize the content data or re-transmit such data to another device. The stream of data may further be encrypted for security in the transmission of the content data.

In the data transfer operation, the data stream that is being transmitted may be changed from a first data mode to a second data mode, where the receiving device is required to interpret and handle the data in the second mode in a manner that is different than data in the first mode.

In conventional systems, a device that is receiving a data stream may detect the change in mode from the first mode to the second mode, and then change operations accordingly. However, a certain amount of data may be interpreted according to the first mode until such time as the receiving device has switched modes. If, for example, the streaming data includes video and audio data the result may be improper display or presentation of data for a period of time until the second device is able to transition to the second mode.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to signaling for transitions between modes of data transmission.

In a first aspect of the invention, an embodiment of a method includes transmitting a data stream over a data link from a first device to a second device, the data stream operating in a first mode; determining that the data stream is to be changed from the first mode to a second mode; and transmitting a message from the first device to the receiver over a control link, the message indicating that the first device will change the data stream from the first mode to the second mode, the message being sent prior to the change to the second mode.

In a second aspect of the invention, an embodiment of method includes receiving a data stream over a data link from a first device at the second device, the first mode being interpreted by the second device in a first manner; receiving a message over a control link from the first device at the second device, message indicating that the first device will change the data stream from the first mode to a second mode, the message being received prior to the change to the second mode; and taking action to prepare for the transition of the data stream to the second mode.

DETAILED DESCRIPTION

Embodiments of the invention are generally directed to signaling for transitions between modes of data transmission.

In some embodiments, a system may provide for signaling for transitions between modes of data transmission. In a system, a first device may transmit a stream of content data to a second device. The data may include, for example, audio/video data, including HDMI™ (High-Definition Multimedia Interface) data and HDMI-m (indicating a modified protocol that may be utilized for devices such as mobile devices) data, where HDMI and HDMI-m provide audio/video interfaces for transmitting uncompressed digital data. The data may be encrypted prior to transmission, such as encryption utilizing HDCP™ (High Bandwidth Digital Content Protection).

In some embodiments, a transmitter unit may utilize a side control channel to send a signal to a receiver unit before the transmitter makes a change to the data stream. In different implementations the change to the mode may be initiated by various elements, such as the transmitter itself or by a user, such as a user who inputs a request for a change in operation. The change to the data stream may include changing a mode of the data stream, which may include interrupting the data stream. The change in the mode stream may occur as a result of a request from a user, a change instituted by the transmitter, or other occurrences. In some embodiments, in scenarios in which a transmitter unit is aware of a request for a mode change before the mode change actually occurs, the transmitter unit may send a sideband message, such as a command or other signal over a control channel, to the receiver unit while the transmitter is still sending out a stable, coherent stream to the receiver over a data link. In some embodiments, the receiver may receive the message, interpret the message, and take action in anticipation of receipt of the change in the data stream, including, for example, reconfiguring the data path of the receiver in anticipation of the mode change presaged by the command or signal. In some embodiments, actions that may be taken by the receiver prior to the change in the data stream may include muting of video or audio data, suspending a state of a decryption engine, or preventing port switching until the mode change has been recognized and processed.

In some embodiments, the transmitter utilizes a control bus or channel for the transmission of the message to the receiver. A control channel from a transmitter to a receiver may be a channel with a sufficiently high bandwidth to send a command or other signal without undue delay. If a user of audio/video data, for example, requests a change in video mode, the transmitter requiring multiple seconds to send the command and then wait for acknowledgement from the receiver would generate a significant and noticeable delay before the transmitter transitions to a different mode. In some embodiments, a "warning" message to a receiver is completed quickly, such as in a fraction of a second so to not be perceivable to the user. The control channel in HDMI—Consumer Electronics Control bus (CEC)—may be utilized, but may generate a delay in transition. In some embodiments, an interface such as an HDMI-m interface may include a Control Bus (CBus) with a bandwidth that is significantly (in the order of 1000× times) higher than HDMI.

In some embodiments, a command is provided without the notification including a closed loop feedback. In some embodiments, the command may include a checksum or other method to prevent the receiver from reading invalid command codes. When a receiver receives a code, the receiver can prepare for the mode change, and then "times out" if the mode change is not seen. In such operation, no additional command is needed from the transmitter.

In some embodiments, a bi-directional control channel utilized for a message allows for the receiver to acknowledge receipt and execution of the warning message. In-band signaling of mode changes, such as transmission of an AVI InfoFrame, would not generally allow a receiver to inform the transmitter of its readiness for the new mode. In some embodiments, different receiver systems may require differing amounts of time to react to a warning message, and thus the transmitter system may benefit from an acknowledgement to allow for delaying its mode change until the acknowledgement is received. In an example, differing times are required in a receiver system for handling mode changes from one progressive video mode to another (which is relatively simple and fast), versus handling a mode change from interlaced to progressive video (which would require flushing of the de-interlacer). In some embodiments, a receiver may return a "no acknowledgement" message (NACK) if the receiver is unable to handle or accept the mode change indicated in the warning message. In some embodiments, the NACK message may include a code or signal indicating a reason for the NACK response. In some embodiments, the transmitter will refrain from changing modes upon receiving the no acknowledgement message.

In some embodiments, a limitation in a system may be that a control channel would generally be required to connect all the way from an original transmitter making the mode change to a final receiver displaying the content if there are intervening devices that handle and pass on a stream of data. If this interconnect is broken by a change of protocol that does not support either the control channel or the processing of the command or signal, then the warning message will be missed and the effects of transitioning between modes without warning will remain for the user. In some embodiments, a point in an interconnect that translates from one protocol (which supports the transfer of a warning message) to another protocol (lacking such support) may be given the task of handling the warning command itself. For example, a "bridge" chip between HDMI-m and HDMI could recognize an incoming warning command from the upstream HDMI-m source, cause the outgoing video and audio streams to be muted, and then wait for the new incoming mode to be stable. As used herein, muting refers to a reduction in a level of a signal, such as, for example, an audio signal being muted by a reduction in volume of the audio signal. In one specific application, a system is to handle interruptions to a data stream when the source system is encrypting and the sink system is decrypting. In an encryption protocol such as HDCP, any interruption to a stable sequence of sync signals and clock may cause the decryption engine to be out of phase with the encryption engine. In some cases this "out of phase" condition cannot be detected in the sink, and the decryption would fail. In some embodiments, if a warning command were sent from the transmitter to the receiver before a mode change that otherwise would upset HDCP or other encryption protocol, then a device such as a receiver logic or an intervening chip in the interconnect may be utilized to gracefully handle the data stream break. In some embodiments, a protocol change includes application of this concept. In some embodiments, a bridge device receiving the incoming HDMI-m stream, as encrypted by the transmitter, may detect the warning message. In some embodiments, the bridge device may decrypt the incoming data stream and re-encrypt the data stream going to the downstream receiver. In some embodiments, if the incoming stream is interrupted, the bridge operates to maintain a stable downstream encrypted stream. In an example, a slower speed warning message may be sent across the downstream protocol so that the final receiver stage can reset itself without locking up for lack of synchronization. In this manner, the bridge device may allow the interconnect to "coast" through the mode change.

In some embodiments, HDMI-m and future link technologies carrying changeable high-speed modes may utilize sideband warnings of mode transitions. While the examples provided here address HDCP, embodiments are not limited to any protocols, and the enhancements to the mode change signaling may be adopted into other encryption/decryption protocols.

In some embodiments, a type of response to an impending change in data mode may be dependent on the type of mode change. For example, a significant change in mode may require a more significant response to address transitional issues. In one example, a mode change that requires more time to accomplish may require a longer time period during which transitional actions are taken.

Figure 1:
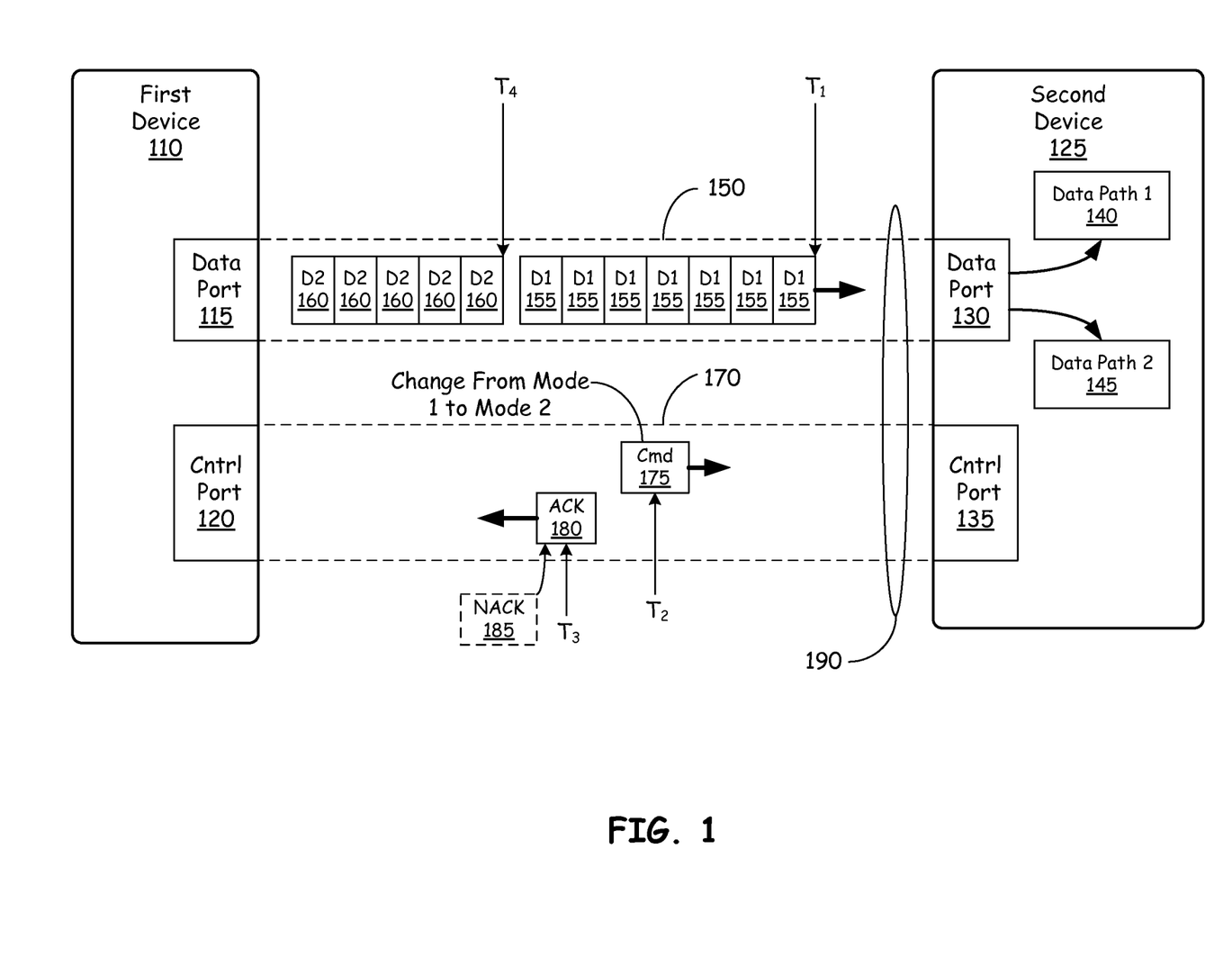
FIG. 1 is an illustration of an embodiment of a system for transfer of data in multiple modes between devices.

FIG. 1 is an illustration of an embodiment of a system for transfer of data in multiple modes between devices. In this illustration, a first device transmits a data stream over a data channel 150 to a second device 125, illustrated as, for example, a transmission from a data port 115 of the first device 110 to a data port 130 of the second device 125. The first device 110 may further include a control port 120 to send certain commands over a control channel 170 to the second device 125 at a control port 135. In one embodiment, the data channel may be an HDMI-m data channel, and the command channel may be an HDMI-m control bus (CBus). In some embodiments, the data channel 150 and control channel 170 may be included in a single cable 190.

In FIG. 1, the first device 110 may transmit the data stream in multiple different modes, shown here as a stream of data elements of a first mode, D1 155, and a stream of data elements of a second mode, D2 160. In operation, the first device may change modes, which may result is changing transmission from the data elements D1 155 to the data elements D2 160. The different modes may represent various different kinds of data, and data of each such mode may be interpreted in a different way. In one example, the modes may include different types of video data, such as a first mode representing a first progressive video mode and then the mode representing a second progressive video mode, which may represent a transition that can be accomplished relatively quickly. In a second example, a first mode may represent an interlaced video mode and a second mode may represent a progressive video mode, which may represent a transition that requires more time flushing of the de-interlacer. In one example, a transition to the second mode may include a break in transmission in which no data is transmitted, which may be followed by data in another format. While FIG. 1 illustrates a first mode and a second mode, a first device and a second device may transfer any number of different modes of data between the devices.

As illustrated, the first device 110 may begin transmission of data in a first mode at time $T_1$. In some embodiments, the first device 110 transfers a command 175 at a time $T_2$ via the command channel 170 to notify the second device 125 that the first device intends to transition from the first mode to the second mode. In some embodiments, the command is transferred and arrives at the control port prior to the intended change in modes such that the second device 125 is warned prior to the arrival of data elements 160 of the data stream at the data port 130.

In some embodiments, the second device 125 may return an acknowledgement message (ACK 180) after receiving the command 175 to acknowledge receipt of the command 175, the message being sent at a time $T_3$. In some embodiments, the second device 125 may alternatively return a no acknowledgement message (NACK 185) to indicate that the second device is unable to accept the mode change. In some embodiments, the NACK 185 may include a code or signal indicating a reason for the inability to accept the mode change. In some embodiments, the second device may be required to provide the acknowledgement or no acknowledgement within a certain predetermined time period. In some embodiments, the first device 110 may wait until receiving the acknowledgement before proceeding with a transition to the second mode, or may proceed after a certain period of time. If the second device returns a NACK 185, the first device may then refrain from the mode change. In some embodiments, the second device 125 may take action to prepare for the transition to the second mode, which may occur at a time $T_4$, and, if the transition does not occur within a certain period of time, the second device may time out and return to the first mode.

In some embodiments, the first and second devices may time the command, the acknowledgement, or the time of transition in a manner to ensure that the second device has had sufficient time to prepare for the transition before there has been a transition between modes. In some embodiments, the second device 125 may send the acknowledgement after taking certain actions to prepare for the change in modes. In some embodiments, the first device may transfer the command 175 at a time that is determined to be sufficient for the mode transition, and thus commands may be transferred earlier if necessary for transition between modes. In other embodiments, the first device waits a certain time after receiving the acknowledgement before transitioning to the second mode to allow the second device 125 sufficient time to prepare for the transition between modes.

Figure 2:
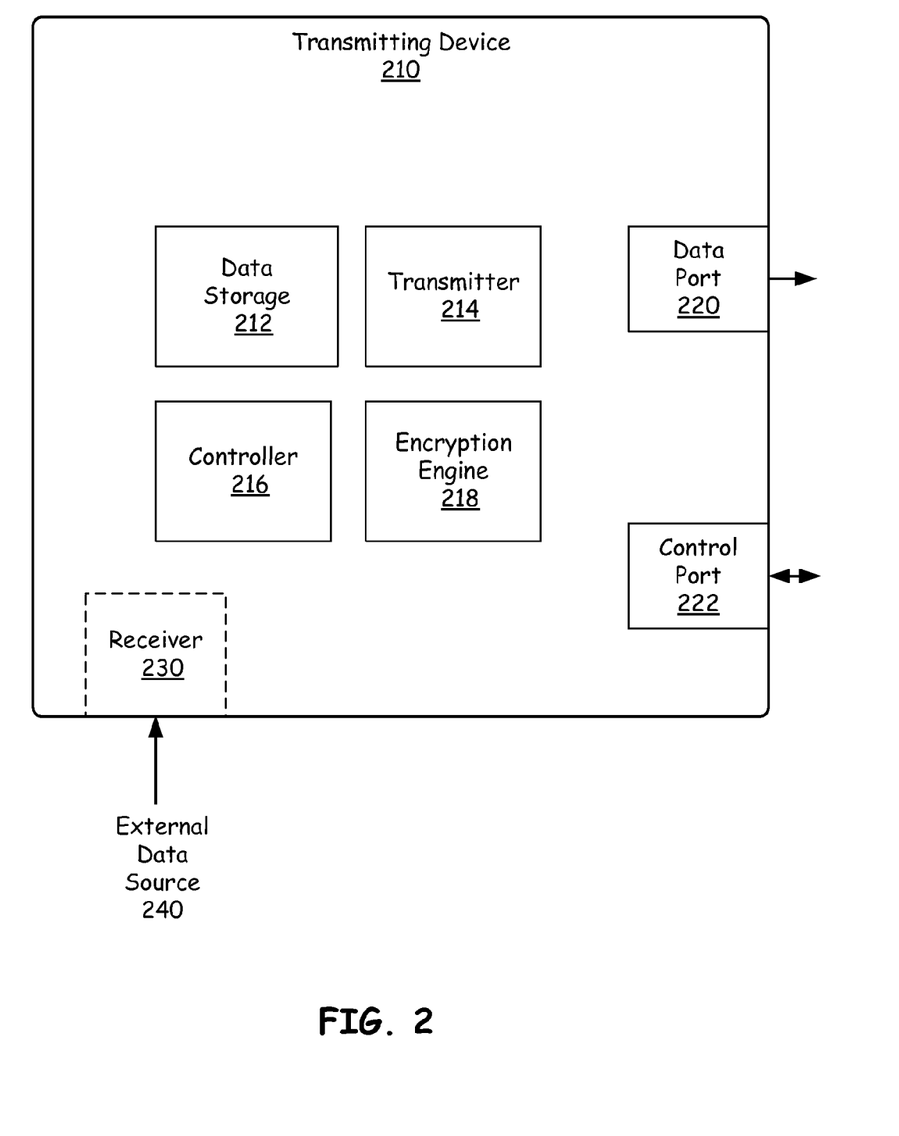
FIG. 2 is an illustration of an embodiment of a transmitting device.

FIG. 2 is an illustration of an embodiment of a transmitting device. In some embodiments, a transmitting device 210 includes a transmitter 214 for the transmission of data, a controller 216 to control data transmission, and an encryption engine 218 to encrypt data prior to transmission. The transmitting device may further include data storage for the storage of data prior to transmission, and a receiver 230 to receive certain data from an external data source 240 prior to transmission.

In some embodiments, the transmitting device 210 includes a data port 220 and a control port 222. In some embodiments, the transmitting device 210 may change the transmission of data during operation. In some embodiments, the transmitting device transmits data in multiple different modes over the data port 220, and may, for example, transition from a first mode to a second mode. In some embodiments, the second mode may include a break in transmission of data in which no data is transmitted, which may be followed by transmission of data in a second format.

In some embodiments, the transmitting device 210 transmits a warning message via the control port 222 to warn a receiving device that the transmitting device is transitioning from the first mode to the second mode. The transmitting device 210 then may wait until an acknowledgement (ACK) is received at the control port 222 before transitioning to the second mode, or may continue with the transition to the second mode if an acknowledgment is not received within a certain time period. In some embodiments, the transmitting device 210 may refrain from transitioning to the second mode if a no acknowledgement (NACK) message is received.

Figure 3:
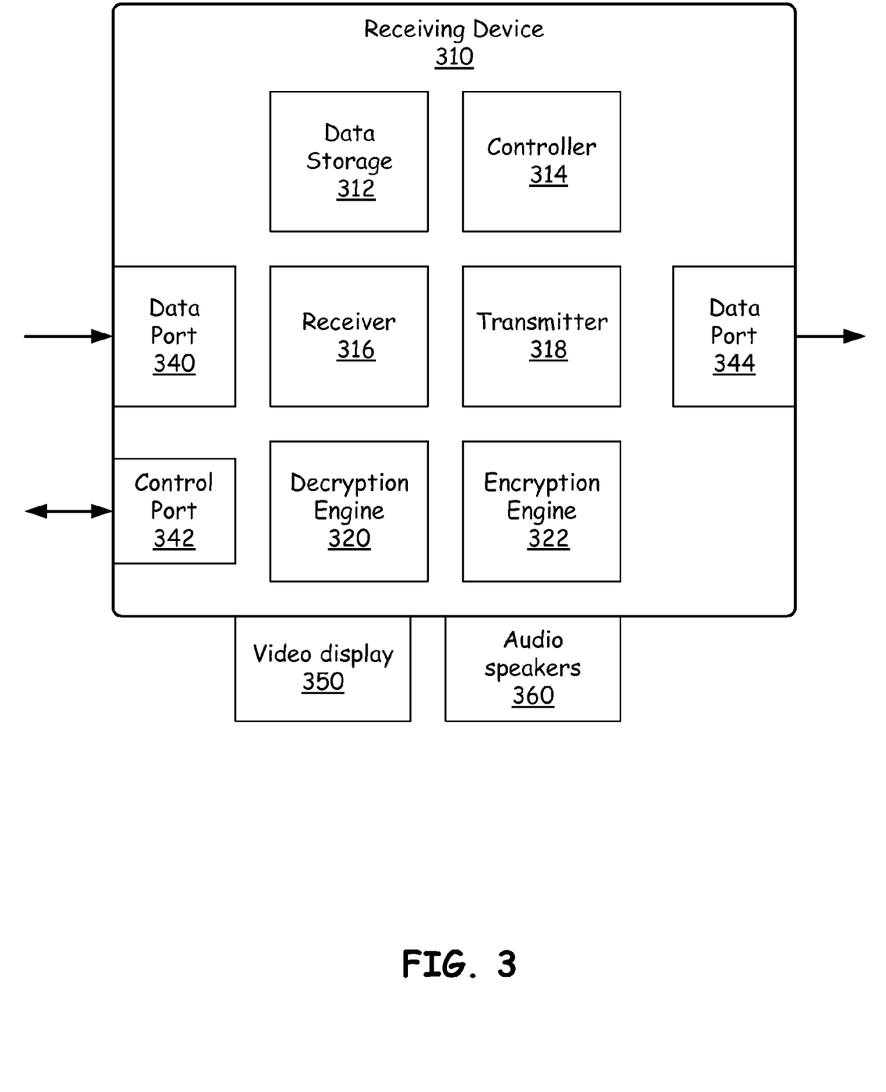
FIG. 3 is an illustration of an embodiment of a receiving device.

FIG. 3 is an illustration of an embodiment of a receiving device. A receiving device may include a sink device that utilizes received data, or a bridge device that receives data and transfers such data to another device. In some embodiments, a receiving device 310 may include a controller 314 to control data operation, a receiver 316 to receive data transmission, and a decryption engine to decrypt received data, together with a data port 340 for receipt of a data stream from a transmitting device and a control port 342 for exchange of commands with the transmitting device. If the receiving device 310 is a sink device, the receiving device may include or may be coupled with one or more devices to use received data, including, for example, a video display 350 and audio speakers 360. The receiving device 310 may also include a data storage 312 for storage of received data, a transmitter 318 to transmit data to another device, an encryption engine 320 to re-encrypt data that is being transmitted to another device, and a second data port 344 for the transmission of data to another device.

In some embodiments, the receiving device may be operable to receive a command from a transmitting device at the control port 342, the command informing the receiving device 310 that the transmitting device will change a data stream received at the data port 340 from a first mode to a second mode. Upon receiving such command at the control port 342, the receiving device 310 is operable to take action to prepare for the change in modes. The receiving device 310 may further send an acknowledgement to the transmitting device via the control port 342 to acknowledge receipt of the command. The receiving device 310 may then wait for the transition to the second mode, and may time out if the transition does not occur within a certain time period. In some embodiments, if the receiving device 310 is unable to handle or accept the transition to the second mode, the receiving device 310 may instead return a no acknowledgement message.

Figure 4:
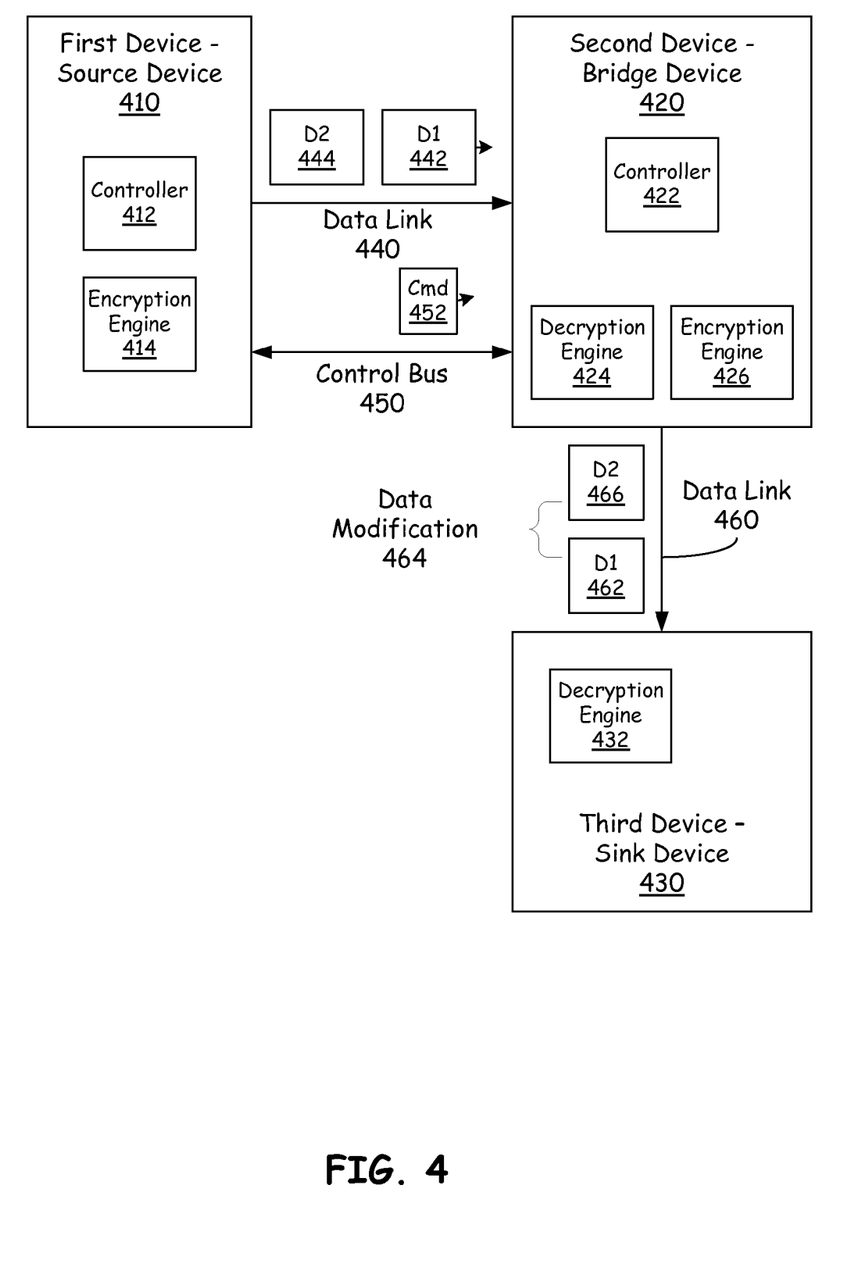
FIG. 4 is an illustration of an embodiment of data transmissions between multiple devices.

FIG. 4 is an illustration of an embodiment of data transmissions between multiple devices. In this illustration, a first device is a source device 410, including a controller 412 and an encryption engine 414, that transmits a data stream to a second device, which in this illustration is a bridge device 420. The second device may then transmit the received data to a third device 430, which may be a sink device that utilizes the data stream.

As illustrated the first device 410 may transmit data in a first mode D1 and may change modes and transmit data in a second mode D2. The first device 410 may further transmit a command 452 to inform the second device 420 that a change in mode of the data stream being transmitted on the data link 440 is forthcoming. In this illustration, the second device may include a controller, as well as a decryption engine 424 and an encryption engine 426. In some embodiments, the controller 422 responds to the command 452 by returning an acknowledgement to the first device 410 and taking action to respond to the change in mode. In some embodiments, controller may respond by returning a no acknowledgement if the second device 420 is unable to handle or accept the change in modes. In an example, the second device may re-transmit data received to a third device 430 over a second data link 460, with the third device 430 being a sink device that utilizes the received data. As illustrated, the third device 430 includes a decryption engine 432 for the decryption of data. As illustrated, the second device 420 may re-transmit the data stream in the first mode 462 and the second mode 466 to the third device. In some embodiments, the second device 420 institutes data modification 464 to allow for the transition between the second device 420 and the third device 430. In some embodiments, the data modification may include muting of the data stream to allow for a smoother transition from the first mode to the second mode. In some embodiments, the second device 420 may provide for transmitting encrypted data as necessary to the third device 430 to smooth transition from the first mode to the second mode and avoid a loss of synchronization at the third device 430, such as, for example, transmitting extra data when there is a break in the data transmission.

Figure 5:
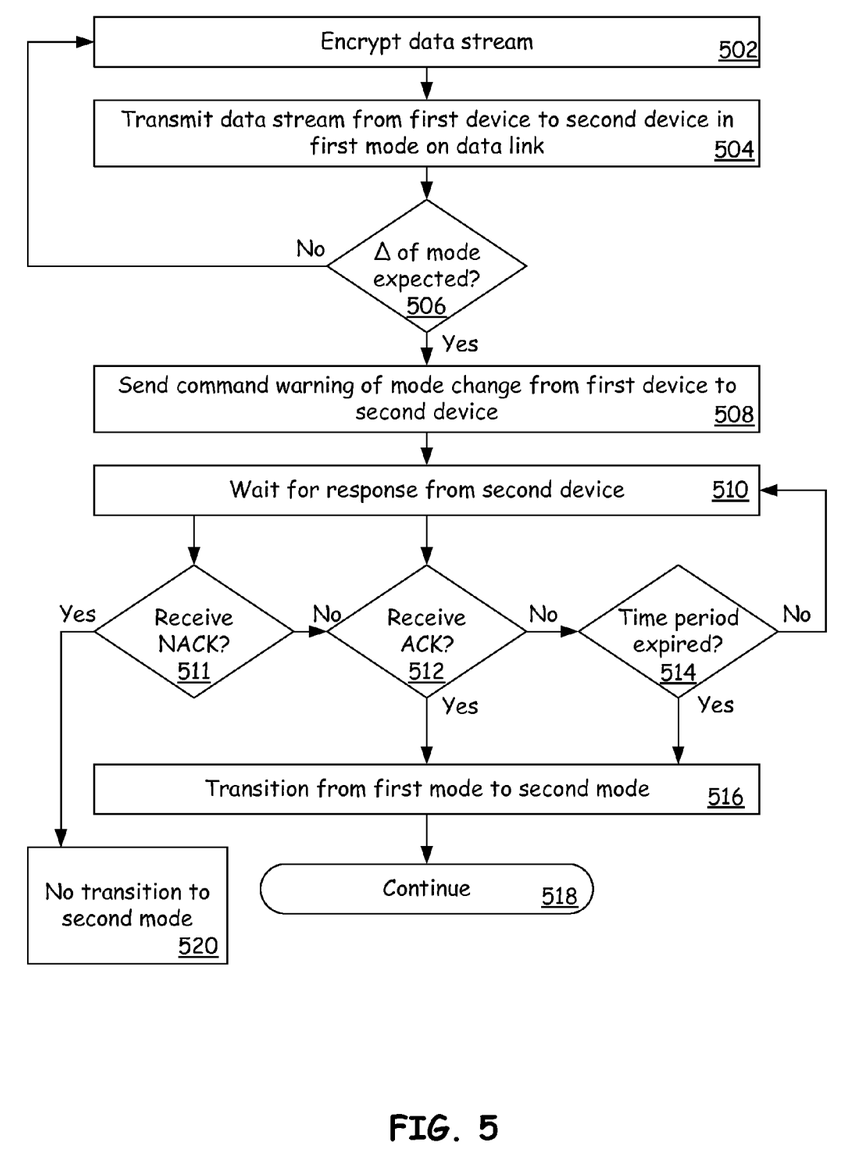
FIG. 5 is a flow chart to illustrate a process for transmission of data in multiple different modes.

FIG. 5 is a flow chart to illustrate a process for transmission of data in multiple different modes. In this illustration, a data stream may generally be encrypted prior to transmission 502, and the encrypted data stream may be transmitted from a first device to a second device over a data link, the data stream being in a first mode 504. When a change in transmission mode for the data stream is anticipated 506, a command or message warning is sent from the first device to the second device 508. In some embodiments, the first device may wait for a response from the second device to acknowledge receipt of the command or message 510. In some embodiments, if the first device receives a no acknowledgement message 511 there is no transition to the second mode 520. If the first device has received an acknowledgement message 512 or a certain time period has elapsed 514, then the first device proceeds to change the transmission of the data stream from the first mode to the second mode 516. The process then continues 518, which may include further transitions in the data stream, such as to a third mode or back to the first mode.

Figure 6:
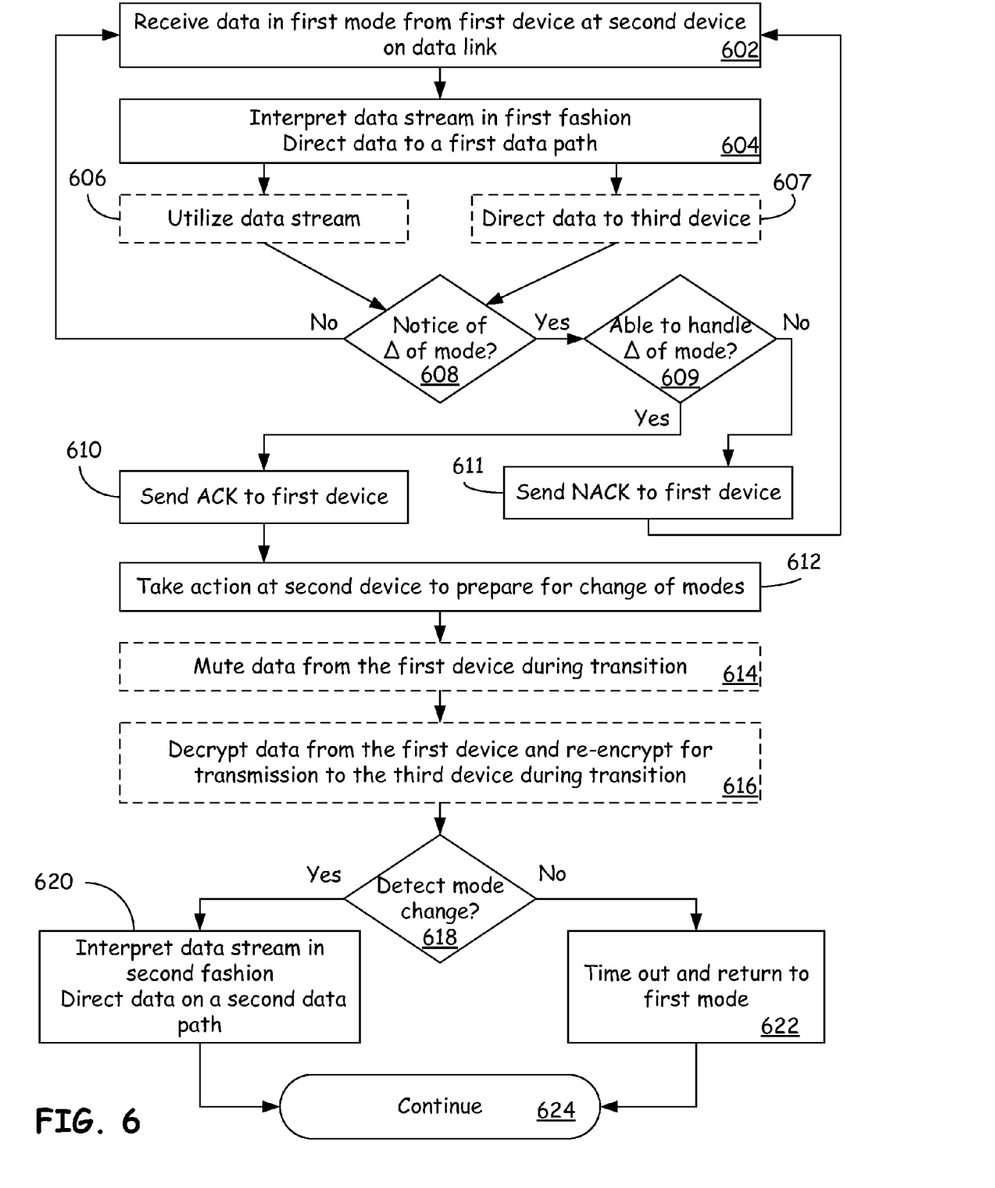
FIG. 6 is a flow chart to illustrate a process for reception of data in multiple different modes.

FIG. 6 is a flow chart to illustrate a process for reception of data in multiple different modes. In this illustration, data may initially be received from a first device over at data link at a second device in a first mode 602. The second device is to interpret the data stream in a first fashion, and may direct the received data stream to a first data path 604. In some embodiments the second device may utilize the data stream 606 and may direct the data stream to a third device 607.

In some embodiments, upon receiving a message on a control line indicating that a change in mode of the data stream is anticipated 608, the second device may return a no acknowledgement NACK 611 if the second device is unable to handle or accept the change in modes 609, and may continue receiving data in the first mode 602. In some embodiments, the second device may otherwise return an acknowledgement message ACK to the first device 610. In some embodiments, the acknowledgement or no acknowledgement may be transmitted via the control line from which the message from the first device was received, and the first device may be required to provide the acknowledgement within a certain predetermined time period after receipt of the message. In some embodiments, the second device takes action to prepare for the change in modes of the data stream 612, including, for example, the muting of the received data before such data is used or re-transmitted 614, or decrypting and re-encrypted data for a period of time before re-transmitted the data stream to a third device 616. While FIG. 6 illustrates the transmission of an acknowledgement prior to taking action to prepare for the change in modes of the data stream, in some embodiments all or a part of the action may be taken prior to the transmission of the acknowledgement. The second device then is to receive the data stream in the second mode 618. If the mode change is detected by the second device 618, the data is the second mode may be interpreted in a second fashion by the second device, and may be directed to a second data path for the second device 620. If the mode change is not detected by the second device 618, the second device may time out and return to the first mode 622. The process then continues 624, which may include further transitions in the data stream, such as to a third mode or back to the first mode.

Figure 7:
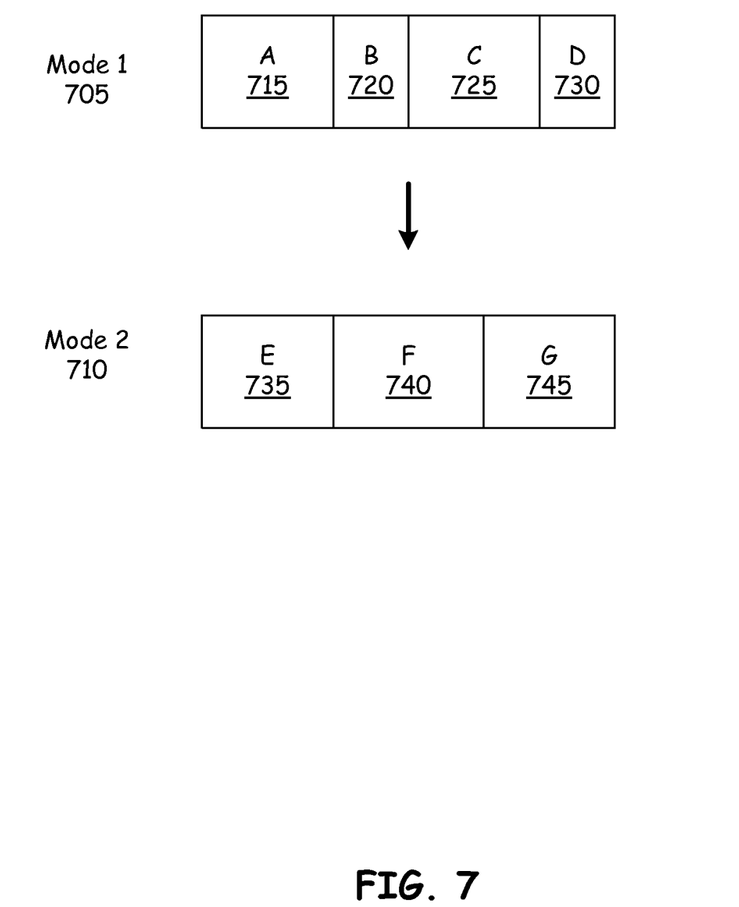
FIG. 7 is an illustration of a data stream that is switched between modes in an embodiment.

FIG. 7 is an illustration of a data stream that is switched between modes in an embodiment. In one example, the first mode may represent a first type of data and the second mode may represent a second type of data. In one example, data in the first mode may include data elements A 715, B 720, C 725, and D 730, while data in the second mode 710 may include data elements E 735, F 740, and G 745. Because of the incompatibility of the first mode and the second mode, continuing to treat the second mode data as first mode data while a receiving device is detecting the change may result in problems in data transmission or usage. In one example, if the data is video or audio data, then the transition between modes may induce significant noise during the transition. In some embodiments, a receiving device will operate to mute or otherwise handle the data during transition between modes to avoid such problems.

Figure 8:
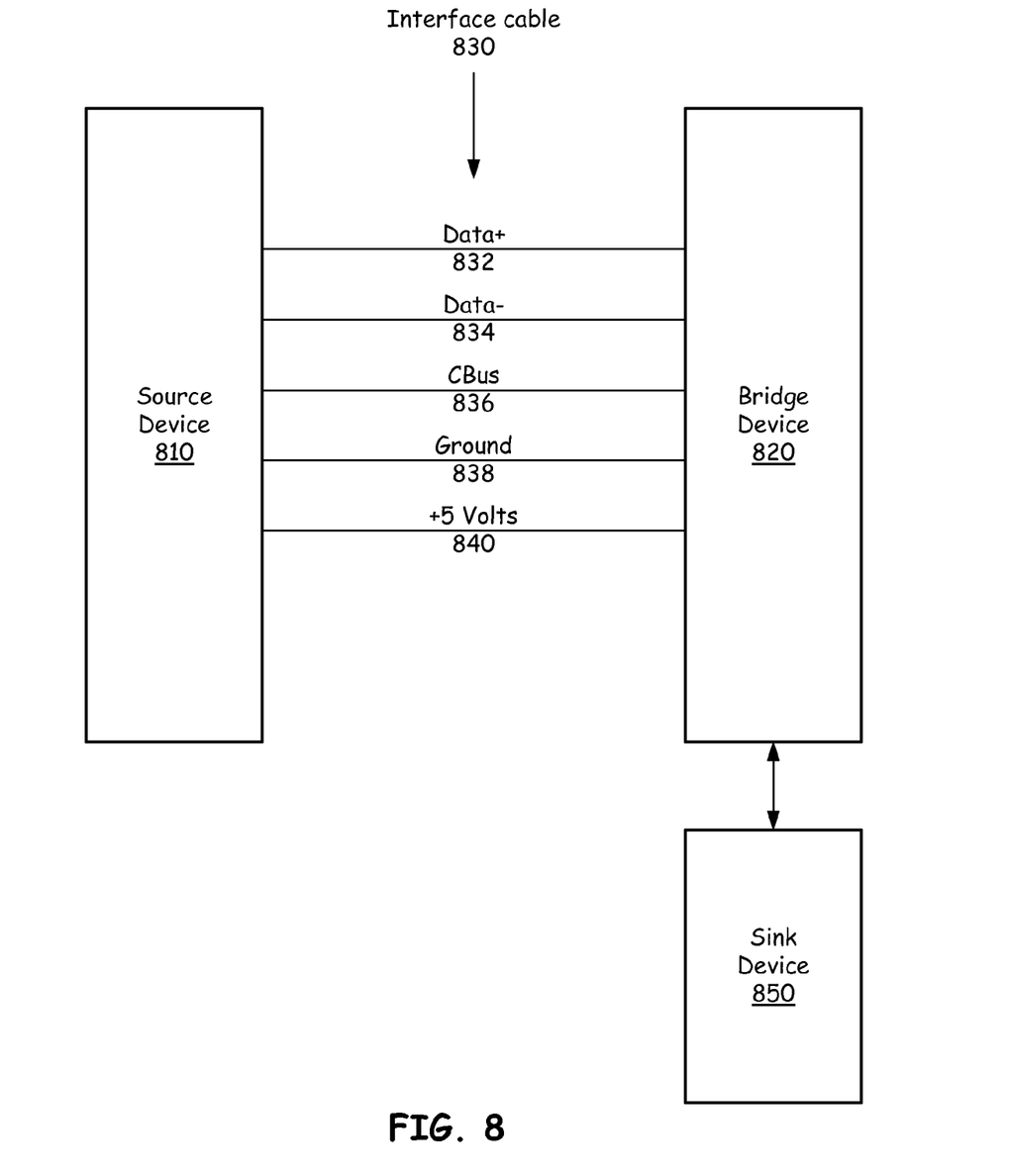
FIG. 8 is an illustration of an interface between devices for an embodiment of a system.

FIG. 8 is an illustration of an interface between devices for an embodiment of a system. In some embodiments, a first device may be a source device 810 and a second device is a bridge device 820, such as HDMI-m source and bridge devices, with the devices being linked via an interface, such as interface cable 830. The bridge device then may be linked to a receiving device 850, such as an HDMI sink device. In some embodiments, the source device 810 may send a data stream to the bridge device 820, with the data stream being sent as differential signals via a data+line 832 and a data- line 834, and the bridge device may re-transmit such data stream to the receiving device 850. In some embodiments, the source device 810 may change the transmission of the data stream from a first mode to a second mode, and prior to transitioning to the second mode the source device 810 sends a message, such as a command, over a single wire control line CBus 836 to inform the bridge device 820 that the data stream will be transitioning from the first mode to the second mode, where the CBus 836 is a bidirectional control line. Upon receiving the message, the bridge device 820 will send an acknowledgement to the source device 810 over the CBus 836, and take action to prepare for the transition between data modes. The interface 830 may further additional lines, illustrated as a ground line 838 and a line carrying a 5 volt potential 840.

Figure 9:
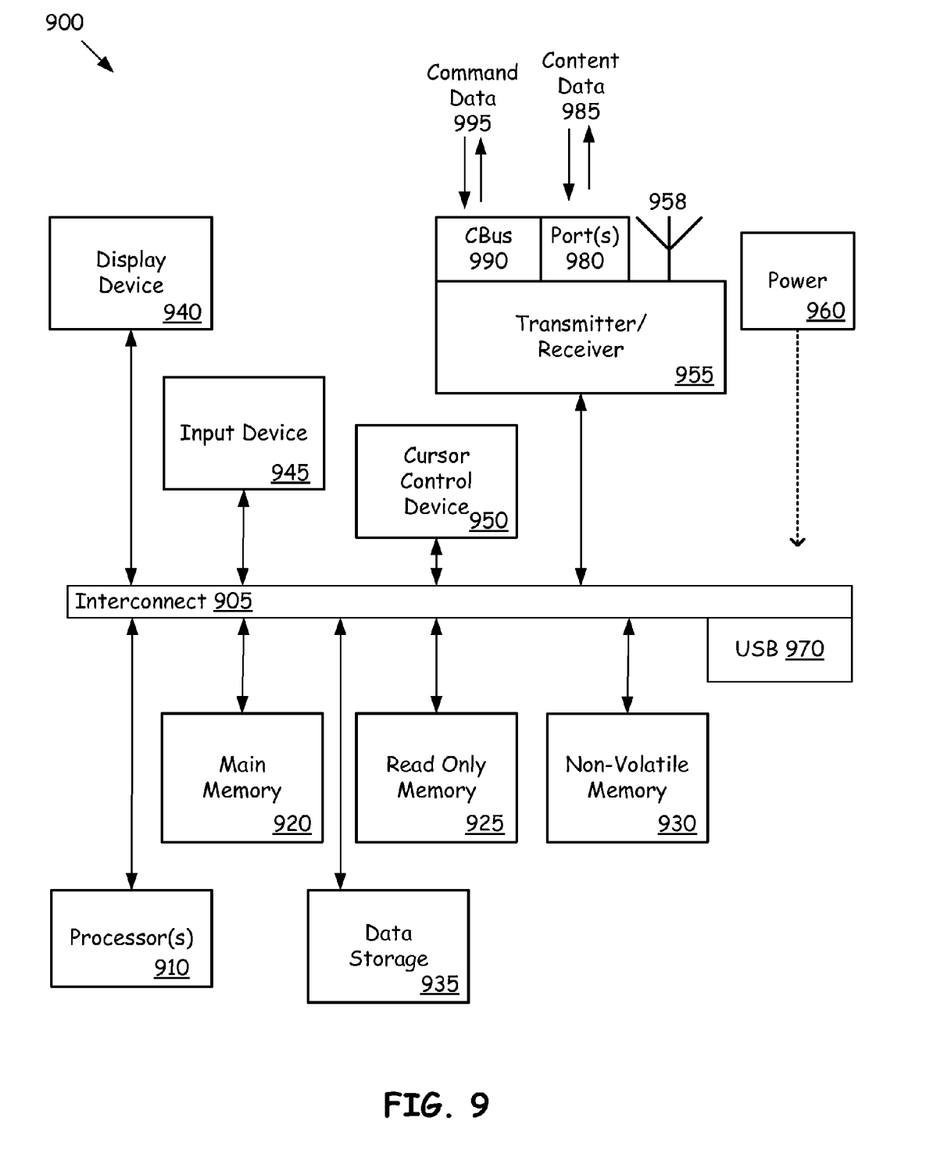
FIG. 9 is an illustration of elements of an embodiment of a source device, bridge device, or sink device.

FIG. 9 is an illustration of elements of an embodiment of a source device, bridge device, or sink device. In this illustration, certain standard and well known components that are not germane to the present description are not shown. Under some embodiments, a device 900 may be a transmitting device, a receiving device, or both.

Under some embodiments, the device 900 comprises an interconnect or crossbar 905 or other communication means for transmission of data. The data may include audio-visual data and related control data. The device 900 may include a processing means such as one or more processors 910 coupled with the interconnect 905 for processing information. The processors 910 may comprise one or more physical processors and one or more logical processors. Further, each of the processors 910 may include multiple processor cores. The interconnect 905 is illustrated as a single interconnect for simplicity, but may represent multiple different interconnects or buses and the component connections to such interconnects may vary. The interconnect 905 shown in FIG. 9 is an abstraction that represents any one or more separate physical buses, point-to-point connections, or both connected by appropriate bridges, adapters, or controllers. The interconnect 905 may include, for example, a system bus, a PCI or PCIe bus, a HyperTransport or industry standard architecture (ISA) bus, a small computer system interface (SCSI) bus, a IIC (12C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 900 further may include a serial bus, such as USB bus 970, to which may be attached one or more USB compatible connections.

In some embodiments, the device 900 further comprises a random access memory (RAM) or other dynamic storage device as a main memory 920 for storing information and instructions to be executed by the processors 910. Main memory 920 also may be used for storing data for data streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 900 also may comprise a read only memory (ROM) 925 or other static storage device for storing static information and instructions for the processors 910. The device 900 may include one or more non-volatile memory elements 930 for the storage of certain elements.

Data storage 935 may also be coupled to the interconnect 905 of the device 900 for storing information and instructions. The data storage 935 may include a magnetic disk, an optical disc and its corresponding drive, or other memory device. Such elements may be combined together or may be separate components, and utilize parts of other elements of the device 900.

The device 900 may also be coupled via the interconnect 905 to a display or presentation device 940. In some embodiments, the display may include a liquid crystal display (LCD), a plasma display, a cathode ray tube (CRT) display, or any other display technology, for displaying information or content to an end user. In some embodiments, the display 940 may be utilized to display television programming. In some environments, the display 940 may include a touch-screen that is also utilized as at least a part of an input device. In some environments, the display 940 may be or may include an audio device, such as a speaker for providing audio information, including the audio portion of a television program. An input device 945 may be coupled to the interconnect 905 for communicating information and/or command selections to the processors 910. In various implementations, the input device 945 may be a keyboard, a keypad, a touch screen and stylus, a voice activated system, or other input device, or combinations of such devices. Another type of user input device that may be included is a cursor control device 950, such as a mouse, a trackball, or cursor direction keys for communicating direction information and command selections to the one or more processors 910 and for controlling cursor movement on the display 940.

One or more transmitters or receivers 955 may also be coupled to the interconnect 905. In some embodiments the device 900 may include one or more ports 980 for the reception or transmission of data. Data that may be received or transmitted may include video data or audio-video data, such as HDMI and HDMI-m data, and may be encrypted for transmission, such as HDCP encrypted data. In some embodiments, the device includes one or more ports for the transmission and/or reception of data 980 for the transfer of content data 985 and one or more ports for the transmission and/or reception of control data 990, such as command data 995. The command data 995 may include one or more messages regarding a change of mode of data transmission, and may include acknowledgements regarding the change of mode of data transmission. In addition, the device 900 may include a USB (Universal Serial Bus).

The device 900 may further include one or more antennas 958 for the reception of data via radio signals. The device 900 may also comprise a power device or system 960, which may comprise a power supply, a battery, a solar cell, a fuel cell, or other system or device for providing or generating power. The power provided by the power device or system 960 may be distributed as required to elements of the device 900.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
   encrypting an uncompressed data stream for transmission;
   transmitting the encrypted data stream over a data link from a first device to a second device, the data stream operating in a first mode, the first mode including transmission of a first type of video data;
   determining that the data stream is to be changed from the first mode to a second mode, the second mode including transmission of a second type of video data, wherein data in the first mode is incompatible with data in the second mode; and
   while the data stream is being transmitted in the first mode via the data link, transmitting a message from the first device to the second device over a single-wire control link between the first device and the second device, the message indicating that the first device will change the data stream from the first mode to the second mode, the message being sent via the single-wire control link prior to the change to the second mode.

2. The method of claim 1, further comprising waiting for a response message from the second device on the single-wire control line.

3. The method of claim 2, further comprising:
   switching transmission of the data stream to the second mode upon receiving an acknowledgement message from the second device via the single-wire control link; and
   refraining from transitioning the data stream to the second mode upon receiving a no acknowledgement message from the second device via the single-wire control link.

4. The method of claim 1, wherein the second device is a bridge device that is to re-encrypt and re-transmit the received uncompressed data stream to a third device.

5. The method of claim 4, wherein the third device is a sink device to use the data stream.

6. The method of claim 4, wherein the third device is a second bridge device.

7. A method comprising:
   receiving an encrypted and uncompressed data stream over a data link from a first device at a second device in a first mode, the first mode including a first type of video data;
   during the reception of the data stream in the first mode via the data link, receiving a message over a single-wire control link from the first device at the second device, the message indicating that the first device will change the data stream from the first mode to a second mode, the message being received prior to the change to the second mode, the second mode including a second type of video data, wherein the first type of video data and the second type of video data are incompatible;
   taking action to prepare for the transition of the data stream from the first mode to the second mode; and
   receiving the data stream in the second mode at the second device.

8. The method of claim 7, further comprising sending an acknowledgement of the message to the first device over the single-wire control link.

9. The method of claim 7, comprising directing the received data stream in the first mode on a first data path and switching the received data stream to a second data path in response to receipt of the message indicating that the first device will change the data stream from the first mode to a second mode.

10. The method of claim 7, wherein the action to prepare for the transition of the data stream from the first mode to the second mode includes muting the data stream until the mode changes, and resuming in the second mode without transmitting an invalid data stream during the transition.

11. The method of claim 7, wherein the second device is a bridge device that is to re-transmit the received data stream to a third device, and further comprising re-encrypting the data stream for transmission to the third device.

12. The method of claim 11, further comprising transmitting additional data to maintain synchronization of the data stream for the third device during transition from the first mode to the second mode.

13. The method of claim 11, wherein the third device does not support a protocol for the message sent via the single-wire control link.

14. A transmitting device comprising:
   a controller to control transmission of video data from the transmitting device;
   an encryption engine to encrypt the video data in an uncompressed data stream;
   a transmitter to transmit the encrypted data stream to a receiving device;
   a data link to the receiving device, the transmitter to transmit the data stream in a plurality of modes on the data link, the plurality of modes including a first mode for transmission of a first type of video data and a second mode for transmission of a second type of video data, the data link including a first data line and a second data line; and
   a single-wire control link to the receiving device, the controller to direct a message to the receiving device over the single-wire control link during a transmission of the first type of video data in the first mode to notify the receiving device that the transmitting device will change transmission of the data stream from transmission of the first type of video data in the first mode to transmission of the second type of video data in the second mode, the controller to direct the transmitter to send the second type of video data in the second mode;

wherein the transmitter is to transmit the message to the receiving device prior to the transmitting device switching to the second mode.

15. The transmitting device of claim 14, wherein the controller is to delay transitioning from the first mode to the second mode until an acknowledgement is received from the receiving device on the control signal link or until a certain time period has elapsed without receipt of the acknowledgement, and is to is to refrain from transitioning from the first mode to the second mode upon receipt of a no acknowledgement message from the receiving device on the control link indicating that the receiving device is unable to accept the transition to the second mode.

16. A device comprising:
 a controller to control handling of data including video data received from a transmitting device;
 a receiver to receive an encrypted, uncompressed data stream including video data from the transmitting device;
 a decryption engine (320) to decrypt the data stream received from the transmitting device;
 a data link from the transmitting device, the device to receive the data stream in a plurality of modes on the data link, the plurality of modes including a first mode for a first type of video data and a second mode for a second type of video data, wherein the first type of video data and the second type of video data are not compatible, the data link including a first data line and a second data line; and
 a single-wire control link with the transmitting device, the device to receive a command signal from the transmitting device over the control link during reception of the data stream in the first mode via the data link to notify the device that the transmitting device will change transmission of the data stream from the first mode to the second mode, the controller to direct action to prepare for data in the second mode;

wherein the transmitter is to transmit the command signal to the receiving device prior to the transmitting device switching to the second mode.

17. The device of claim 16, wherein the device is a bridge device to re-transmit the data stream to a third device via a second data link, and further comprising a transmitter to transmit the data and an encryption engine to re-encrypt data prior to re-transmission.

18. The device of claim 16, wherein the action to prepare for data in the second mode includes the controller to direct the provision of additional data to maintain synchronization of the data to the third device during the transition to the second mode.

19. The device of claim 16, wherein the controller directs the data stream on a first data path for the first mode and on a second data path for the second mode.

20. The device of claim 16, wherein the device provides an acknowledgment of the command signal to the transmitting device via the single-wire control link.

21. The device of claim 20, wherein the device is required to provide the acknowledgment of the command within a certain time period.

22. The device of claim 16, wherein the device is to provide a no acknowledgement signal of the command signal to the transmitting device via the control signal link upon determining that the device is not able to accept data in the second mode.

23. The device of claim 16, wherein the controller is to transition the device back to a state for receipt of data in the first mode if a transition of the data stream to the second mode is not detected within a certain time period.

* * * * *